Dec. 11, 1962 W. E. BUCK 3,067,617
PRESSURE GAGE
Filed April 13, 1959 4 Sheets-Sheet 1

INVENTOR.
WILLARD E. BUCK
BY
ATTORNEYS

Dec. 11, 1962 W. E. BUCK 3,067,617
PRESSURE GAGE
Filed April 13, 1959 4 Sheets-Sheet 2

INVENTOR.
WILLARD E. BUCK
BY
ATTORNEYS

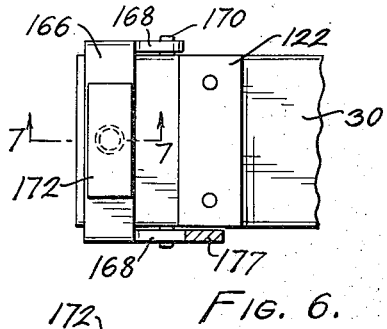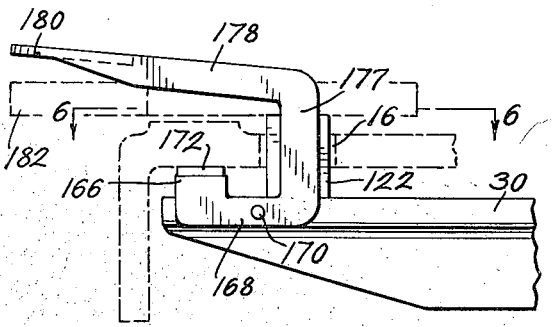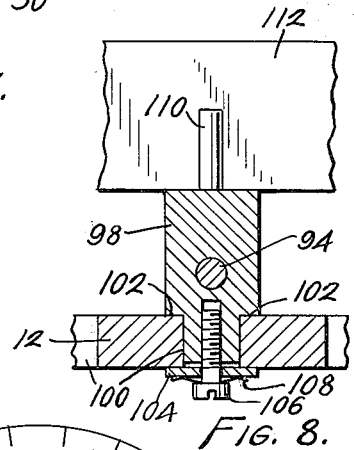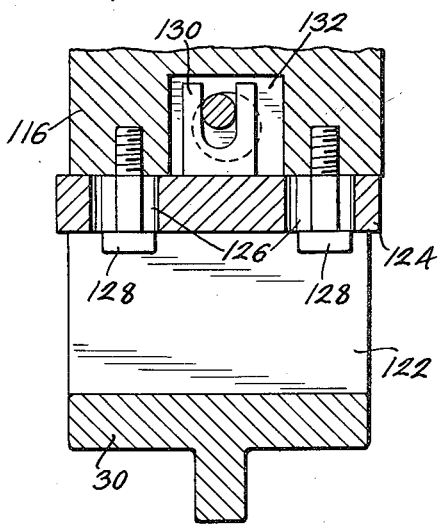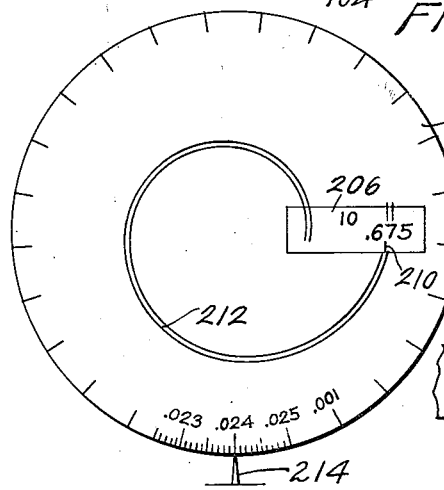

Dec. 11, 1962 W. E. BUCK 3,067,617
PRESSURE GAGE
Filed April 13, 1959 4 Sheets-Sheet 4

INVENTOR.
WILLARD E. BUCK
BY
ATTORNEYS

United States Patent Office 3,067,617
Patented Dec. 11, 1962

3,067,617
PRESSURE GAGE
Willard E. Buck, Boulder, Colo., assignor, by mesne assignments, to Thomas W. Russell, Boulder, Colo.
Filed Apr. 13, 1959, Ser. No. 806,018
11 Claims. (Cl. 73—411)

This invention relates to measuring instruments and, more specifically, to an improved pressure gage of a type that includes the load-sensitive element which forms the subject matter of my co-pending application filed concurrently herewith together with a novel mechano-optical correction system adapted to substantially eliminate any non-linearity in the read-out mechanism.

Up to the present time the most accurate barometric devices are those that include as their pressure-sensitive element a mercury manometer or series thereof. Instruments of this type are in widespread use and have been found adequate for a number of applications; however, recent technological advances, especially in the field of missile development, have proven them deficient in many important respects.

Of the more significant limitations of the prior art pressure-sensitive devices, perhaps the most important is that of sensitivity. About the best that can be expected of a mercury barometer under ideal conditions is a sensitivity of approximately one part in ten thousand. Unfortunately, in many specialized applications, sensitivities of this order of magnitude are insufficient or at best marginal. Therefore, there is a definite need for a pressure gage or the like having a greater sensitivity than those presently available.

Another problem of considerable importance is the fact that mercury barometers of the type aforementioned are extremely delicate and cannot, in any sense, be looked upon as being portable. For instance, most of these barometers are mounted permanently on a fixed base in a test facility. This means, of course, that much of the complex instrumentation being tested must be removed from its environment, transported to the test facility where the barometer is located, and returned for reinstallation. Obviously, delicate instruments are difficult to move from place-to-place in this manner without damaging them and, if the damage occurs after they have been tested, a malfunction may occur without warning.

Still another difficulty arises in connection with calibration of mercury barometers. Although instruments of this type are substantially linear, for maximum sensitivity they require that the mercury be removed and the tubes cleaned at frequent intervals. Also, each reading must be corrected to compensate for both temperature and gravity.

In addition to the aforementioned mercury barometers which are generally accepted as being the most sensitive of the prior art pressure gages, there are a number of other types of pressure-responsive instruments that are suitable for use in less critical applications. Of these, the only ones that need be considered here are those that include as their pressure-responsive element, a rotatable indicator or mirror suspended between pairs of skewed filaments.

In general, pressure gages of the rotating mirror type are much less sensitive than even a mercury barometer due to substantial hysteresis in the system and frictional losses found in various mechanical movements thereof. Also, these devices are somewhat sensitive to changes in temperature which renders the readings taken therefrom unreliable unless corrected. Finally, the presence of tensioned filaments, springs, etc., in the pressure-responsive systems of most of these instruments introduces considerable non-linearity that makes them extremely difficult to calibrate and read.

It has now been found, however, that a greatly improved pressure gage can be made which overcomes most of the aforementioned deficiencies in the prior art devices, yet which includes as its load-responsive element, a filament-supported rotatable indicator instead of a mercury-tube manometer. In the instant invention, a suitable indicator, preferably a mirror, is suspended between opposed pairs of tensioned and torsionally deflected filaments that are in turn attached to a Bourdon tube or other pressure-sensitive element to form the load-responsive system of the instrument. A reflected-image-type optical system is operatively associated with the pressure-sensitive system to produce a visual indication on a linear scale. A novel mechano-optical cam-actuated correction system is used to reorient the reflected image and correct for any non-linearity introduced by non-uniform tensional and torsional loading of the filaments across the range of the instrument, and a photoelectric split-image type null indicating system is used to zero-in the corrected reflected image on the scale.

It is, therefore, the principal object of the present invention to provide a pressure gage having a sensitivity of more than twenty times that of any other instrument for the purpose.

A second object is to provide a pressure-sensitive instrument of the type aforementioned that is quite rugged and portable, yet reliable.

A third objective is the provision of a barometric device that reads substantially linearly over its entire range without being difficult to calibrate.

A fourth objective of the invention is to provide a measuring instrument having an extremely accurate optical read-out system of a type adapted for either manual or automatic operation.

Another object is to provide a novel and improved cam-actuated mechano-optical correction system for measuring instruments.

Still another object of the invention is the provision of a photo-electric split-image-type null indicator for optical read-out systems.

Additional objectives are to provide a pressure-sensitive measuring device of the class described which is compact, lightweight, easy to operate, simple to service, relatively inexpensive and decorative in appearance.

Other objects will be in part apparent and in part pointed out specifically hereinafter in connection with the description of the drawings that follow, and in which:

FIGURE 5 is a fragmentary elevation to an enlarged scale showing the details of the coarse-adjustment mechanism of the optical read-out system;

FIGURE 6 is a fragmentary section taken along line 6—6 of FIGURE 5;

FIGURE 7 is a fragmentary section taken along line 7—7 of FIGURE 6;

FIGURE 8 is a fragmentary section taken along line 8—8 of FIGURE 1 showing the details of the cam-forming mechanism;

FIGURE 9 is a fragmentary section to an enlarged scale taken along line 9—9 of FIGURE 3 showing the fine-adjustment mechanism of the optical read-out system;

FIGURE 10 is a fragmentary front elevation of a linear scale that can be used with the gage, portions thereof having been broken away to conserve space;

FIGURE 11 is a front elevation of the dial on the reader of the read-out system to a further enlarged scale;

Figure 1:
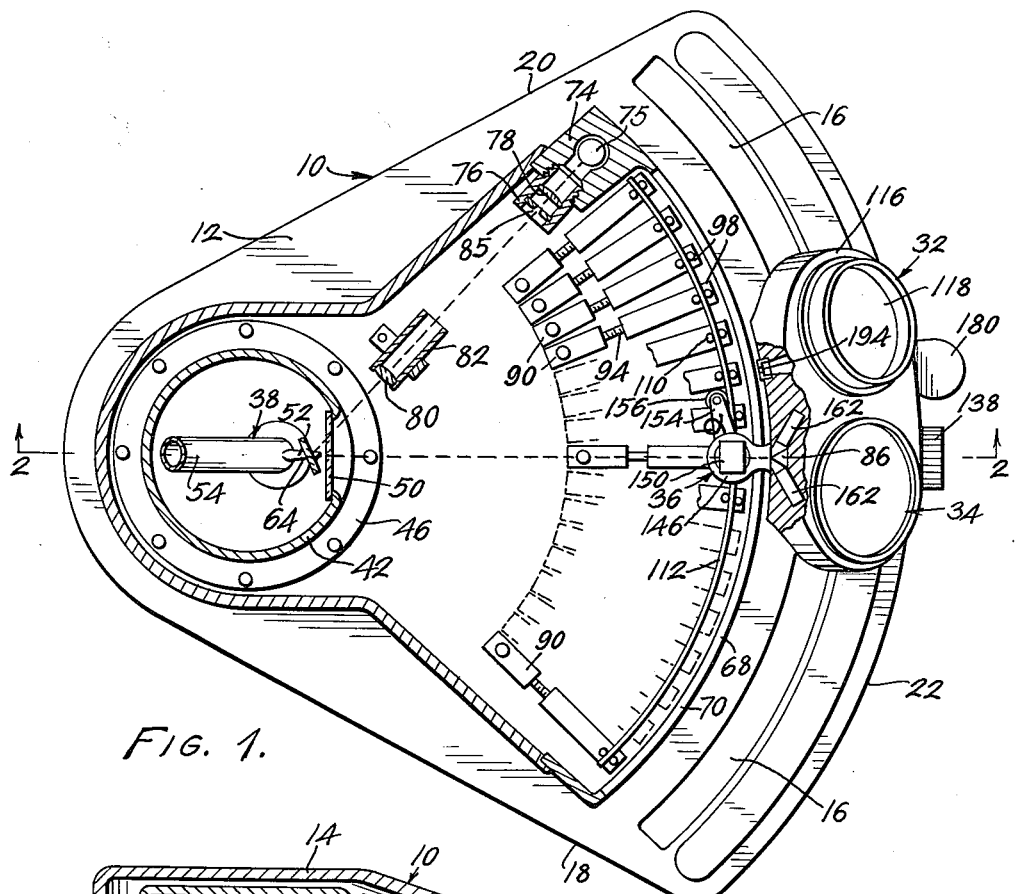
FIGURE 1 is a horizontal section taken along line 1—1 of FIGURE 2 showing the pressure gage of the present invention, certain portions thereof having been broken away and indicated by dotted lines.
Figure 2:
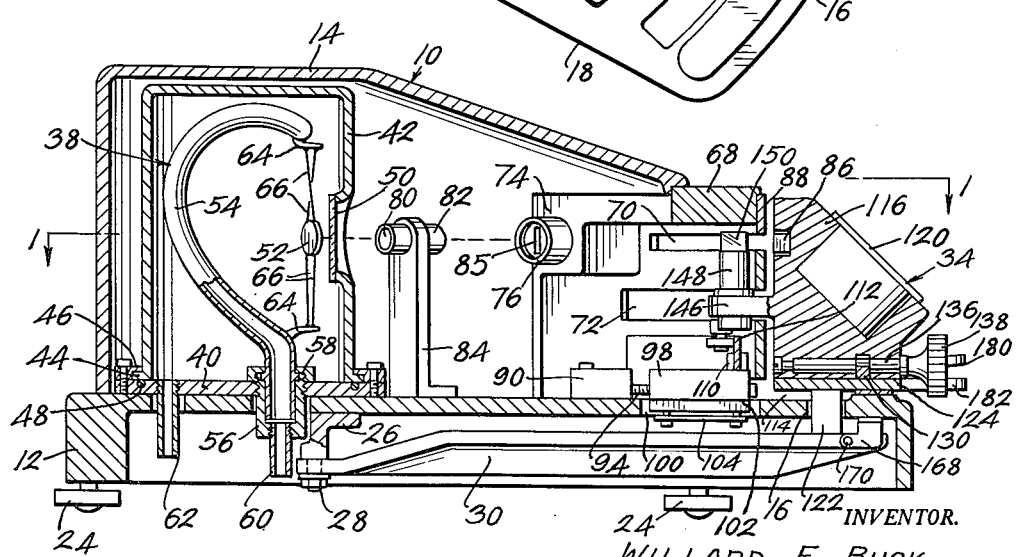
FIGURE 2 is a longitudinal section taken along line 2—2 of FIGURE 1 with certain portions broken away to better show the construction.
Figure 3:
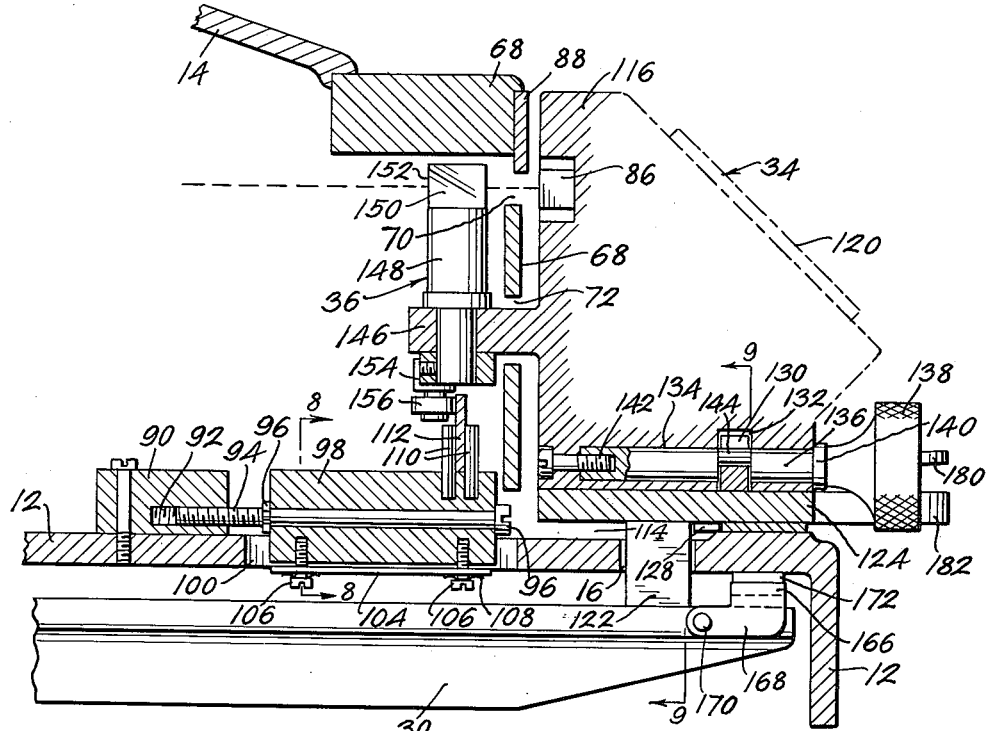
FIGURE 3 is an enlarged fragmentary section showing various elements of the optical read-out system and correction system.

Referring now to the drawings, and in particular to FIGURES 1 and 2 thereof, the pressure gage of the present invention has been shown housed in a case indicated in a general way by numeral 10 that includes a base 12 and a detachable cover 14. The base is generally sector-shaped and contains an arcuate slot 16 that extends between the divergent side edges 18 and 20 along the curved front edge 22. The corners of the base are preferably supported on adjustable legs 24 that form a tripod and provide the means by which the instrument can be leveled.

A bracket 26 having a pin 28 projecting downwardly therefrom at the center of the circular arc defined by slot 16, supports a radial arm 30 for pivotal movement. The optical read-out system, null indicating system and portions of the calibration system, which have been indicated broadly by numerals 32, 34 and 36, respectively, are attached to the free end of radial arm 30 through slot 16 for arcuate slidable movement along the top of the base in a manner that will be described in greater detail in connection with FIGURES 3, 5, 6 and 7.

The pressure-sensitive rotating mirror system of the pressure gage has been indicated in a general way by numeral 38 and is supported on the base above the pivotal connection for the radial arm. This system is housed within a chamber defined by a plate 40 attached to the base, an inverted cup-like member 42 having a flange 44 around the lower edge thereof, and a collar 46 adapted to receive the flange on the cup-like member holding the same in sealed relation on the plate to which the collar is bolted. An O-ring seal 48 is preferably located between the contacting surfaces of the plate and flange cup-like element in order to form an air-tight seal around the base of the chamber. The front of the cup-like element contains a window 50 located immediately ahead of the mirror 52 of the rotating mirror system. A fused quartz Bourdon tube 54 is attached and sealed within registering openings through plate 40 and base 12 by means of a two-part connector 56 containing an O-ring seal 58. Thus, a positive pressure connected into Bourdon tube 54 through pipe 60 attached into the lower end of fitting 56, will tend to straighten out the crook in the Bourdon tube in a manner well known in the art. A second pipe 62 is also connected through the base 12 and plate 40 into the interior of the chamber to provide means for measuring differential pressures, both above and below atmospheric across the walls of the Bourdon tube. In other words, when the instrument is used to measure positive pressures, pipe 62 is open to the atmosphere and the Bourdon tube is connected by means of pipe 60 to the source of positive pressure. If, on the other hand, the instrument is to be used in measuring negative pressures, the Bourdon tube is opened to the atmosphere and pipe 62 is connected to the negative pressure source to produce a vacuum inside the chamber. In differential pressure measurements when neither pressure is atmoshperic, the greater of the two pressures is connected into the Bourdon tube and the lesser into the chamber through pipe 62.

Now, it will be seen that opposite ends of the crook in the Bourdon tube are provided with fused quartz filament supports 64 arranged in opposed relation to one another but preferably in different planes that intersect one another along a line substantially coincident with the pivot axis of radial arm 30. Two pairs of quartz filaments 66 are arranged in opposed relation with their opposite ends fused to the supports 64. The adjacent ends of the filament pairs are fused to opposite portions on the edge of the mirror 52 as shown. In accordance with the teaching of my copending application filed concurrently herewith, each filament of each pair thereof is preloaded torsionally in the same direction approximately the same amount. In addition, each filament of each pair is preloaded tensionally such that the tensional forces acting on the pairs of filaments in a direction to move them from a skewed relation toward a coplanar relation is counterbalanced by an equal and opposite torsional force acting to move the filaments from a skewed relation in the direction of a crossed relation.

The non-linearity of the system is substantially reduced by reason of the fact that the two pairs of filaments are arranged in intersecting planes rather than a common plane prior to attachment to the mirror. This means that when one pair of filaments moves into co-planar relation as the mirror turns, the other pair is becoming more skewed or moving closer to a crossed relation which maintains a fairly uniform force relationship in all angular positions of the mirror.

It is also important to mention that the instant rotating mirror system contains no measurable hysteresis when the several elements thereof are formed from quartz with fused joints therebetween. In addition, for all practical purposes the system is frictionless as there are no surfaces rubbing against one another, no bearings and no springs other than the filament pairs.

Now, the front of the gage is provided with an arcuate face 68 that extends from side-to-side along an arc about the axis of rotation of the mirror as a center and includes a pair of spaced substantially parallel openings or slots 70 and 72. The face is mounted on the base slightly to the rear of slot 16 as shown most clearly in FIGURE 1. One end of the face 68 includes a lamp housing 74 containing a lamp 75 adapted to provide a source of illumination. The rear face of the lamp housing is provided with a tubular element 76 whose axis intersects the axis of rotation of the mirror at about the center of the latter. A plano-convex lens or the like 78 is located within the tubular element 76 and is adapted to focus the filament of the lamp onto the objective lens 80 positioned between it and the mirror within tube 82. A bracket 84 supports tube 82 such that the axis thereof is substantially coincident with the axis of tube 76. The rear end of tube 76 contains a disk having a vertical slit 85 formed therein that functions to reduce the light beam to an elongated narrow slit. Lens 80 is an achromat or the like adapted to focus the slit of light on to the apex of the splitting prism 86 in the null-indicating portion of the reader which will be described presently. Splitting prism 86 is movable along the base along with various associated elements of the null-indicating system, optical read-out system and calibration system into position to intercept the light beam reflected from the mirror 52.

With reference now to FIGURES 1–4 and 8 of the drawings, it will be seen that the front of face 68 is provided with a scale 88 extending from side-to-side thereof above slot 70. This scale is linear and may include equal divisions of a 25/1000 of an inch as shown in FIGURE 10. The degree of angular deflection of the mirror 52 in response to different pressures applied to the Bourdon tube is, however, a non-linear function that is preferably correctable to read linearly. Although the non-linearity of the system can often be reduced below one percent by a proper selection of the range of pressures to be measured and the design of the mirror assembly, even this error must be eliminated by either correction or calibration in order to provide sensitivities of one part in two hundred thousand or better that can be realized with this gage. Thus, the instant pressure gage is provided with a novel cam-actuated mechano-optical correction system 36 adapted to deflect the light beam between the mirror and splitting prism in a manner to compensate for any errors introduced by reason of the non-linearity of the pressure-sensitive mirror assembly 38.

Accordingly, it can be seen that a plurality of fixed threaded elements 90 are attached to the base in arcuately arranged side-by-side relation. Each of these elements contains a threaded socket 92 (FIGURE 3) whose axis extends substantially radially from the axis of rotation of the mirror. An adjustment screw 94 having spaced abutments 96 on the shank thereof is mounted within the threaded socket in each of the elements 90 for relative axial and rotational movement. An adjustable element 98 is mounted between the abutments 96 on the shank of each of the screws for movement toward and away from fixed element 90 to which it is operatively connected for radial movement relative to the mirror axis in response to rotational movement of the screw. Note in connection with FIGURES 3 and 8, that the base 12 contains a plurality of radial slots 100 located underneath each of the adjustable elements 98 which receive the portions thereof lying between shoulders 102 for radial adjustable movement. A friction plate 104 is attached to the underside of each element 98 by means of a pair of screws 106 and springs 108 which cooperate with the shoulders 102 to provide a yieldable friction connection between the base and adjustable element that allows the latter to slide yet maintains it in adjusted position. Of course, by tightening the screws 106 sufficiently tight against the springs and plate, the adjustable element can be held in substantially fixed position so that it cannot be moved by screw 94.

Each adjustment element 98 has a pair of pins 110 projecting upwardly therefrom in spaced relation to one another and arranged one behind the other. These pins retain therebetween a spring band or strip 112 that extends in a generally arcuate path along behind the face of the gage. It will be apparent from an examination of FIGURES 3 and 4 that this spring steel strip can be bent and deflected to form an irregular cam surface by turning the adjustment screws either in or out to change the relative radial positions of the adjustable elements 98 and pairs of pins 110 carried thereby. The slotted heads of these adjustment screws are readily accessible through opening 114 in the face immediately above the base.

Before completing the description an explanation of the correction system 38, it is advisable to mention briefly the manner in which the case 116 for the reader 118 and null indicator 120 is mounted on the radial arm 30 for arcuate swinging movement therewith and for limited adjustable movement relative thereto. For this purpose, reference will be had to FIGURES 2, 3 and 9 of the drawings.

The radial arm 30 carries a block 122 near its free end in position to project upwardly through arcuate opening 16 in the base. A bedplate 124 is then mounted on top of the block 122 extending both forwardly and rearwardly therefrom across the upper face of the base. The bedplate 124 is provided with a pair of transversely aligned and transversely extending slots 126 adapted to receive the shanks of screws 128 that are threaded into the underside of the case 116 for limited relative movement. Thus, the case is connected to the arm, block and bedplate for limited transverse movement relative thereto and this feature constitutes the fine adjustment assembly of the optical read-out system which will be described in detail presently.

The actuating means by which this fine adjustment is accomplished comprises a generally U-shaped yoke or bracket 130 attached to the upper surface of the bedplate and projecting into a socket 132 formed in the underside of the case. The socket is intersected by a longitudinal bore 134 within which is mounted for rotational movement the stem 136 of a fine adjustment control having a knob 138 projecting from the front face of the case 116. The stem includes an annular shoulder 140 which turns against the face of the case and a screw 142 threaded into the rear end thereof whose head is recessed to form a rotatable retaining element. That portion of the stem lying within the socket in the underside of the case is cut away to provide an eccentric portion 144 positioned between the spaced legs of the yoke. As the knob and stem are turned, the eccentric portion 144 engages one of the legs of the yoke 130 and moves the case 116 from side-to-side relative to the radial arm 30, block 122 and bedplate.

Returning once again to that portion of the correction system 36 illustrated in FIGURES 1–4 of the drawing, it will be seen that the reader case 116 includes an arm 146 projecting rearwardly therefrom through slot 72 intermediate the top and bottom edges of the face 68. Arm 146 is provided with an opening therethrough within which is mounted for rotation about a substantially vertical axis, a prism mount 148 on the top of which is carried a prism 150 having a pair of plane polished faces 152 arranged in spaced parallel relation to one another and substantially perpendicular to the reflected image from the mirror. A crank arm 154 is attached to the prism mount for rotation therewith and carries a roller 156 journalled for rotation on its free end in position to roll along the rear face of the cam strap 112 above the pins 110. Spring 158 attached between arms 146 and 154 biases the roller against the cam strap.

Now, it is, of course, obvious that the function of the optical read-out system 32, yet to be described, is to provide the operator with a visual indication of the pressure being measured by the gage as shown on the scale 88 viewed through reader 118. Location of the optical read-out system at the correct position in front of the scale, however, is determined by the null-indicating system 34 which is set to intercept the reflected image from the mirror and split the same on splitting prism 86. Null indicator 120 will show no deflection one way or the other when prism 86 exactly splits the light beam reflected thereon by the mirror and it is this position that corresponds to the final pressure reading to be taken from the reader. Were it is not for the fact that the correction system 36 is interposed between the mirror 50 and splitting prism 86 to correct for any non-linearity in the mirror system 38, scale 88 would have to be non-linear and the manufacture of the instrument would involve expensive and time consuming calibration. Inclusion of the mechano-optical correction system, on the other hand, permits a linear scale 88 to be used and enables the instrument to be calibrated quite easily in accordance with the procedure which will now be set forth.

First of all, a known pressure is applied to the instrument and the reader 118 is positioned to read this exact pressure on the linear scale. In all probability, however, the null indicator will show deflection to the right or left meaning that the splitting prism is not dividing the reflected image from the mirror into two exactly equal parts because of the non-linearity error in the mirror system. Such errors are usually of the order of one percent or less in a properly designed unit and are easily compensated for with the correction system by merely turning the adjustment screw or screws 96 closest to the roller 156 in or out to shift the position of adjustment elements 98 and pin pairs 110 radially, thus bending spring strip 112 in a manner to turn prism 150. As shown most clearly in FIGURE 3, when prism 150 turns it deflects the light beam reflected thereon from mirror 50 laterally to one side or the other depending upon the direction of its angular movement. As soon as the laterally offset light beam emerging from prism 150 is exactly split into two beams of equal magnitude by prism 86 as evidenced by no deflection of the null indicator needle, the non-linearity error for the specific pressure being tested has been compensated for by the correction system. The foregoing calibration process is then repeated for a plurality of selected known pressures covering the full range of the particular gage. Thus, cam strip 110 becomes a correction curve adapted to mechanically compensate for non-linearity in the mirror system. Once the gage has been calibrated in the manner aforementioned, the adjustment elements 98 can be tightened in place by means of screws 106.

Figure 4:
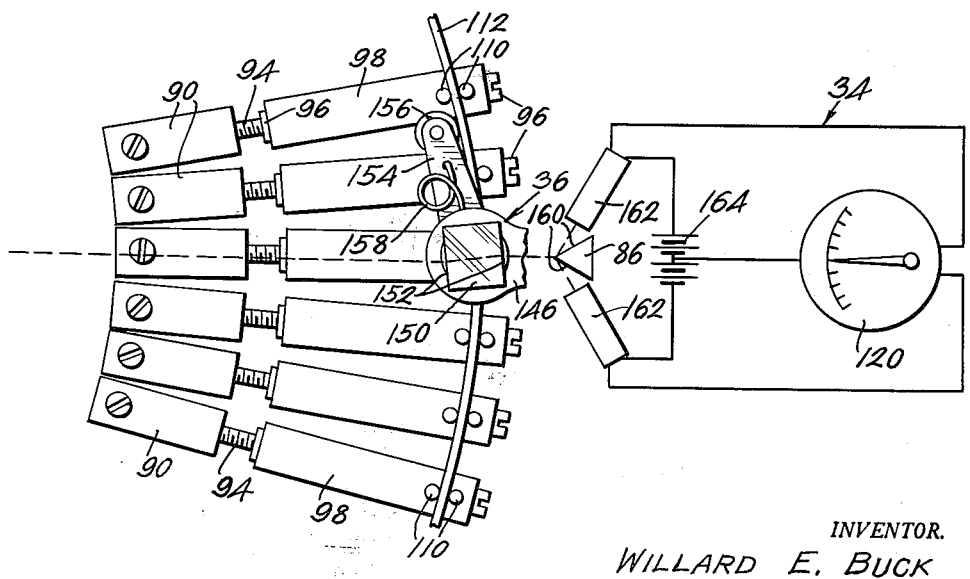
FIGURE 4 is a fragmentary top plan view to an enlarged scale showing the details of the cam-actuated mechano-optical correction system along with a schematic representation of the photoelectric null indicator of the optical read-out system in operative association therewith.
Figure 12:
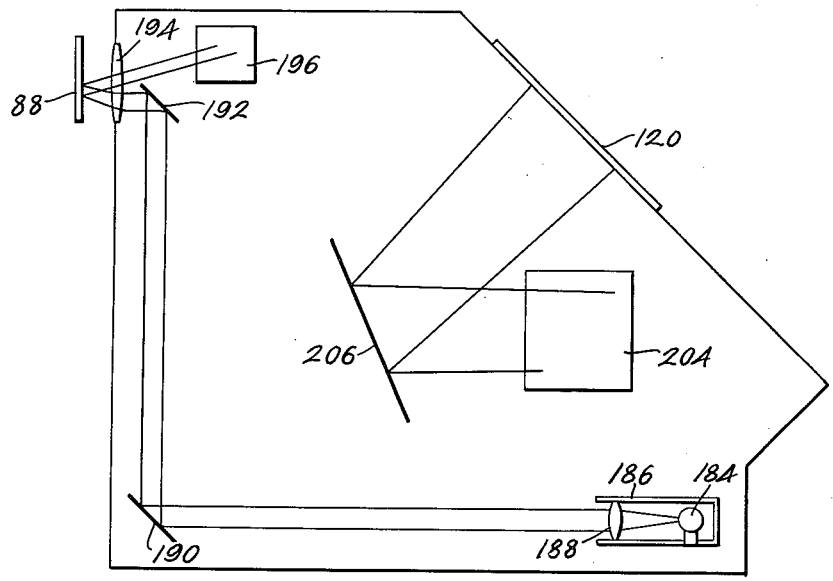
FIGURE 12 is a schematic representation to a further enlarged scale showing the optical reader in side elevation; and, FIGURE 13 is a view similar to FIGURE 12 showing a top plan view of the reader.
Figure 13:
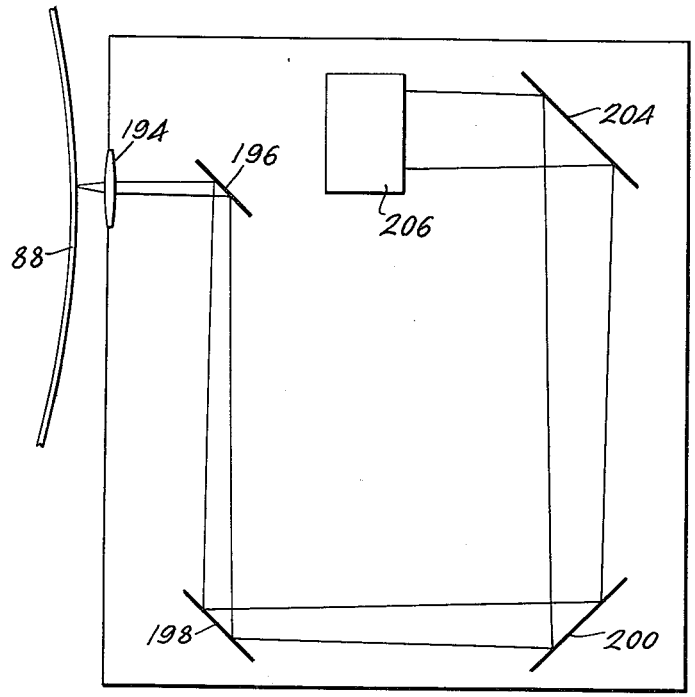

The null-indicating system 34 is best shown in FIGURE 4 and can be seen to comprise splitting prism 86 having a pair of angularly inclined plane polished surfaces 160 positioned to receive the light beam reflected from mirror 50 through prism 150, a pair of photoelectric cells 162 located on opposite sides of the splitting prism in position to receive that portion of the light beam reflected from one of the plane polished surfaces thereof, a galvanometer or null indicator 120, and a source of electrical energy 164 having a center tap. Both the galvanometer and the battery are connected in branched series circuits each of which contains one of the photocells. When the prism 86 splits the light beam such that the amount of light falling on each photocell is exactly the same, no current will flow through the meter and it will show no needle deflection. If, on the other hand, more light falls on one photocell than the other evidencing the fact that the prism is not splitting the beam equally, the current flow through the two branches will be unbalanced by reason of the different resistances of the cells causing the needle of the meter to deflect. Fine adjustment of the apex of prism 86 relative to the light beam emerging from prism 150 is accomplished by rotation of control knob 138 in the manner already set forth in detail.

The friction braking system which functions to hold the case 116 in coarse adjustment relative to the base 12 can best be described in connection with FIGURES 3, 5, 6 and 7 to which reference will now be had. An inverted generally U-shaped element 166 extends transversely across the top of the radial arm 30 and includes a pair of rearwardly extending projections 168 arranged in spaced substantially parallel relation alongside the arm to which they are pivotally attached for movement about a transverse axis on pins 170. A friction shoe 172 is mounted on the top of element 166 in position to engage the underside of base 12 when forced thereagainst by compression spring 174 mounted within depression 176 (FIGURE 7) in arm 30. Shoe 172 is disengaged from the base 12 by depressing an operating lever which includes an integrally formed upright portion 177 depending from one of the projections 168 in position to extend upwardly through slot 16, and a substantially horizontal portion 178 that terminates in a flattened fingerhold 180. In the specific embodiment of the invention illustrated herein, bedplate 124 includes a forwardly extending projection 182 that underlies fingerhold 180 and enables the friction brake to be actuated by a pinching action.

The coarse adjustment is, therefore, accomplished by releasing the friction braking system and swinging arm 30, case 116 and the associated elements carried thereby from one side to the other across the scale until the null indicator needle is deflected indicating that prism 86 has passed by the light beam emerging from prism 150. Then, the brake is set to hold the splitting prism in position to intercept the light beam while the fine adjustment control knob is turned back and forth until the quantity of light reflected therefrom into each photocell is exactly balanced.

Finally, one form of optical read-out system 32 that may be employed to advantage in the pressure gage of the present invention will be described in connection with FIGURES 10-13, inclusive. The scale 88, as has already been mentioned, is linear, being divided into a plurality of equal divisions. In the example shown, the top portion of the scale is graduated in inches of mercury while the lower portion thereof is subdivided in increments of $25/1000$ of an inch. Case 116 is provided with a lamp 184 housed in a tube 186 containing a lens 188 adapted to direct a beam of light onto a first mirror 190 which reflects the beam into a second mirror 192 that illuminates the scale 88 through the lower portion of a second lens 194. The numerals on that portion of the scale immediately behind lens 194 are then reflected through the upper portion thereof onto a third mirror 196 and a succession of mirrors 198, 200 and 204 until magnified several times before being reflected finally through window 206 in the case onto the inside of ground glass 208 of the reader 120 where they can be read by the operator. Thus, as shown in FIGURE 11, the reading 10.675 inches of mercury might appear on the ground glass within the window. Each twenty-five thousandth increment on the lower portion of the scale includes an index mark 210 that can be lined up between the double lines of a single-turn spiral 212 etched on the ground glass which is rotatable within a suitable mount on the front of the case. The peripheral edge of the ground glass is provided with a scale running from .000 to .025 inch in increments of .0001 of an inch of mercury corresponding to the spread between the ends of the double line spiral. Thus, by interpolating between the adjacent increments on the ground glass nearest the index mark 214 on the case, it becomes possible to read the gage to accuracies of .00005 of an inch of mercury. For example, the pressure indicated in FIGURE 11 would be 10.675±.02400 or 10.69900 inches of mercury.

Having thus described the many useful and novel features of the pressure gage of the present invention in connection with the accompanying drawings, it will be seen that the several useful objects for which it was designed have been achieved. Although but a single specific form of the invention has been illustrated and described herein, I realize that certain changes and modifications therein may occur to those skilled in the art within the broad teaching hereof; hence, it is my intention that the scope of protection afforded hereby shall be limited only insofar as said limitations are expressly set forth in the appended claims.

What is claimed is:

1. In a pressure gage, load-sensitive means including a pair of opposed supporting surfaces at least one of which is movable relative to the other in response to changes in pressure, indicating means including a mirror suspended for rotational movement between opposed pairs of skewed filaments attached to the supporting surfaces, each filament of each pair being pre-loaded torsionally in the same direction to move the pairs thereof toward crossed relation, and each filament of each pair being pre-loaded tensionally to counteract the torsional pre-loading thereof and move the respective pairs toward coplanar relation, illuminating means including a light source and lens-containing means adapted to direct and focus a light beam onto the reflecting surface of the mirror, and reader means cooperable with the mirror positioned in the path of the light beam reflected therefrom adapted to interpret the angle of deflection of said light beam and translate same into terms of a pressure measurement reading.

2. The pressure gage as set forth in claim 1 in which the load-sensitive means comprises a Bourdon tube.

3. The pressure gage as set forth in claim 1 in which the reader means includes a null indicator adapted to locate the center of the light beam reflected from the mirror, said indicator comprising a prism having a pair of reflecting surfaces arranged in angularly disposed relation to one another in the path of the light beam to split same into two separate parts, a pair of photoelectric cells located on opposite sides of the prism in position to receive the parts of the split beam reflected therefrom, a single galvanometer connected in separate series circuits each of which includes one of the photoelectric cells, and a source of direct current connected to deliver balanced current to each of the series circuits when the prism splits the light beam in a manner to reflect an equal amount of light into each photoelectric cell.

4. The pressure gage as set forth in claim 1 in which, a scale means including pressure indicating indicia is positioned in spaced relation to the axis of rotation of the mirror located in the plane defined by the sweep of the light beam reflected therefrom, and in which the reader means is mounted for movement along the scale means in position to intercept the light beam reflected from the mirror, said reader means including correction means positioned between the mirror and scale means, said correction means comprising a prism having a pair of parallel plane polished faces carried by the reader means for movement therewith into position to intercept the light beam and for rotational movement about an axis lying in spaced substantially parallel relation to the axis of rotation of the mirror, cam means extending in the direction of the length of the scale means, and a cam follower connected to the prism for rotating same and for movement therewith along the cam means, said cam means and cam follower being adapted to cooperate with one another at any position of the reader means along the scale means to turn the prism through the angle required to deflect the light beam passing between the parallel plane surfaces thereof by the amount necessary to compensate for any non-linearity in the indicating means.

5. The pressure gage as set forth in claim 1 in which, a scale means including pressure indicating indicia is located in the plane defined by the sweep of the light beam reflected by the mirror and arranged arcuately about the axis of rotation of the mirror as a center, reader support means are mounted for movement along the scale means, and fine adjustment means operatively interconnecting the reader means and the reader support means adapted to provide for limited relative transverse movement therebetween.

6. The pressure gage as set forth in claim 2 in which a housing having an opening therethrough encloses the Bourdon tube and indicating means, said housing and Bourdon tube cooperating to form means adapted for differential measurement of any two pressures.

7. The pressure gage as set forth in claim 4 in which, the cam means comprises a deformable strip, and cam-forming means are operatively connected with the strip, said cam-forming means comprising a plurality of elements mounted in side-by-side relation for independent radial adjustment relative to the axis of rotation of the mirror, each of said elements receiving a portion of the strip and being adapted upon adjustment to bend same.

8. The pressure gage as set forth in claim 4 in which the cam follower comprises a crank arm having one end connected to the prism, a roller adapted to roll along the cam means mounted for rotation on the other end of the crank arm, and spring means connected to bias the roller against the cam means.

9. The pressure gage as set forth in claim 5 in which the fine adjustment means comprises a shaft having an eccentric portion mounted for rotation within one of said reader means and reader support means, and a yoke receiving the eccentric portion of the shaft mounted on the other of said reader means and reader support means.

10. The pressure gage as set forth in claim 5 in which braking means operatively interconnects the reader support means and scale means adapted to fix the relative positions thereof while the reader means is adjusted.

11. The pressure gage as set forth in claim 7 in which the cam-forming elements each include a pair of spaced pins adapted to lap the strip.

References Cited in the file of this patent

UNITED STATES PATENTS

| | | |
|---|---|---|
| 2,136,682 | Gilbert | Nov. 15, 1938 |
| 2,243,398 | Sewell | May 27, 1941 |
| 2,279,261 | Crawford | Apr. 7, 1942 |
| 2,295,026 | Brown et al. | Sept. 8, 1942 |
| 2,564,669 | Brady | Aug. 21, 1951 |
| 2,676,515 | Diehl | Apr. 27, 1954 |

FOREIGN PATENTS

| | | |
|---|---|---|
| 178,789 | Great Britain | Apr. 18, 1922 |